Jan. 28, 1958 J. M. R. LYETH, JR 2,821,096
VEHICLE DIFFERENTIAL WITH CUMULATIVE TORQUE RESISTANCE
Filed June 22, 1956 4 Sheets-Sheet 1
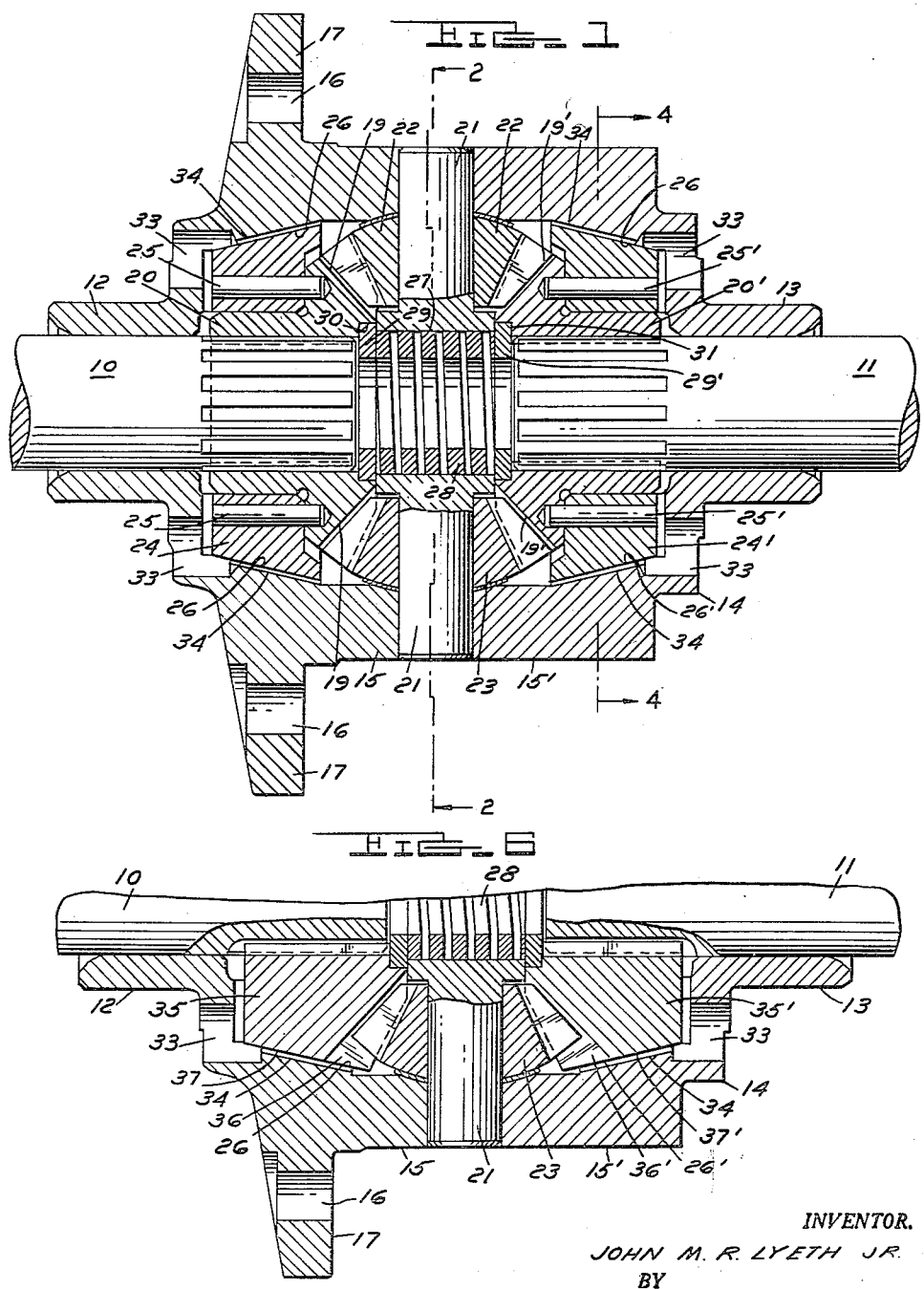
INVENTOR.
JOHN M. R. LYETH JR.
BY Thomas J Hughes
ATTORNEY

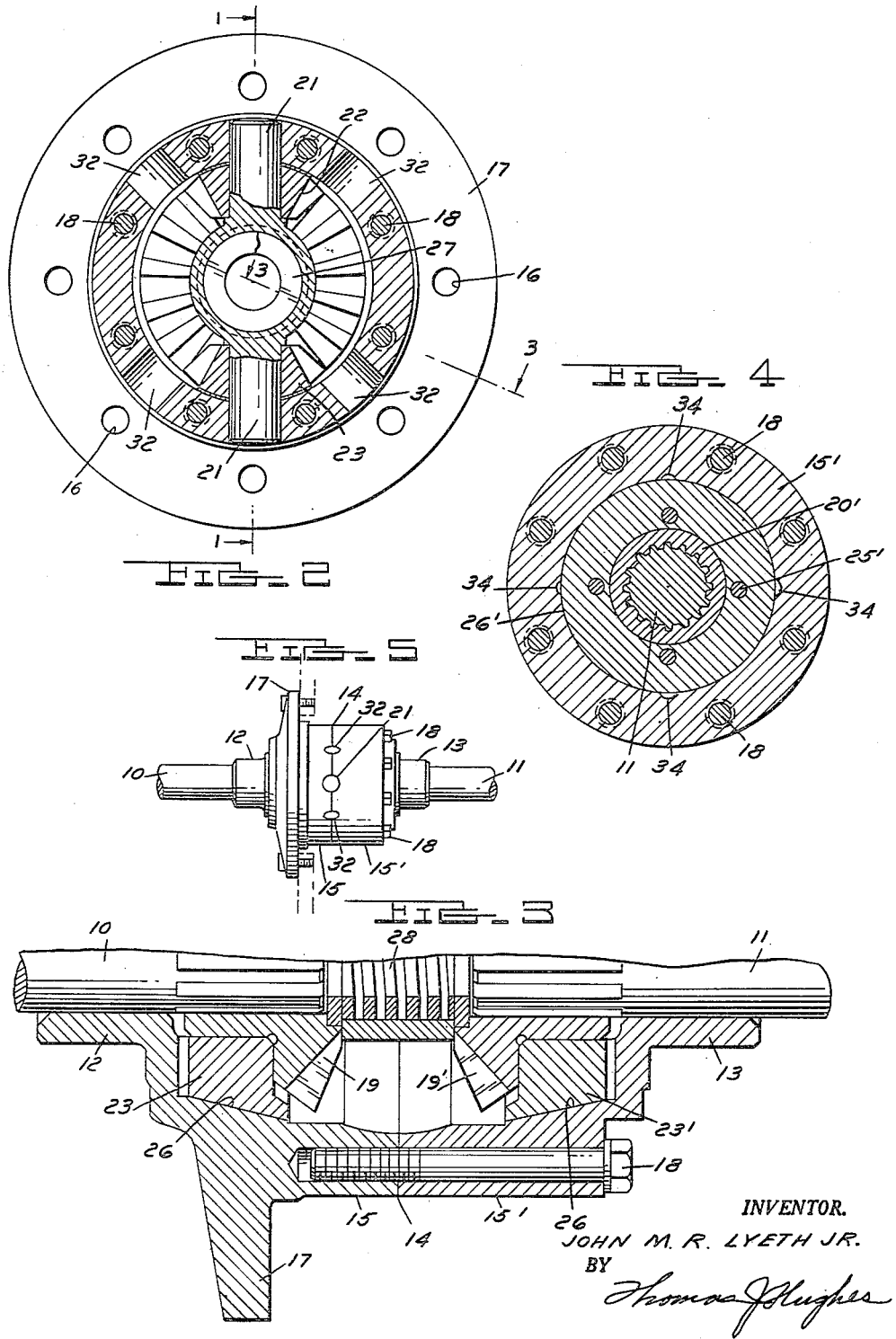

Jan. 28, 1958     J. M. R. LYETH, JR     2,821,096
VEHICLE DIFFERENTIAL WITH CUMULATIVE TORQUE RESISTANCE
Filed June 22, 1956     4 Sheets-Sheet 3
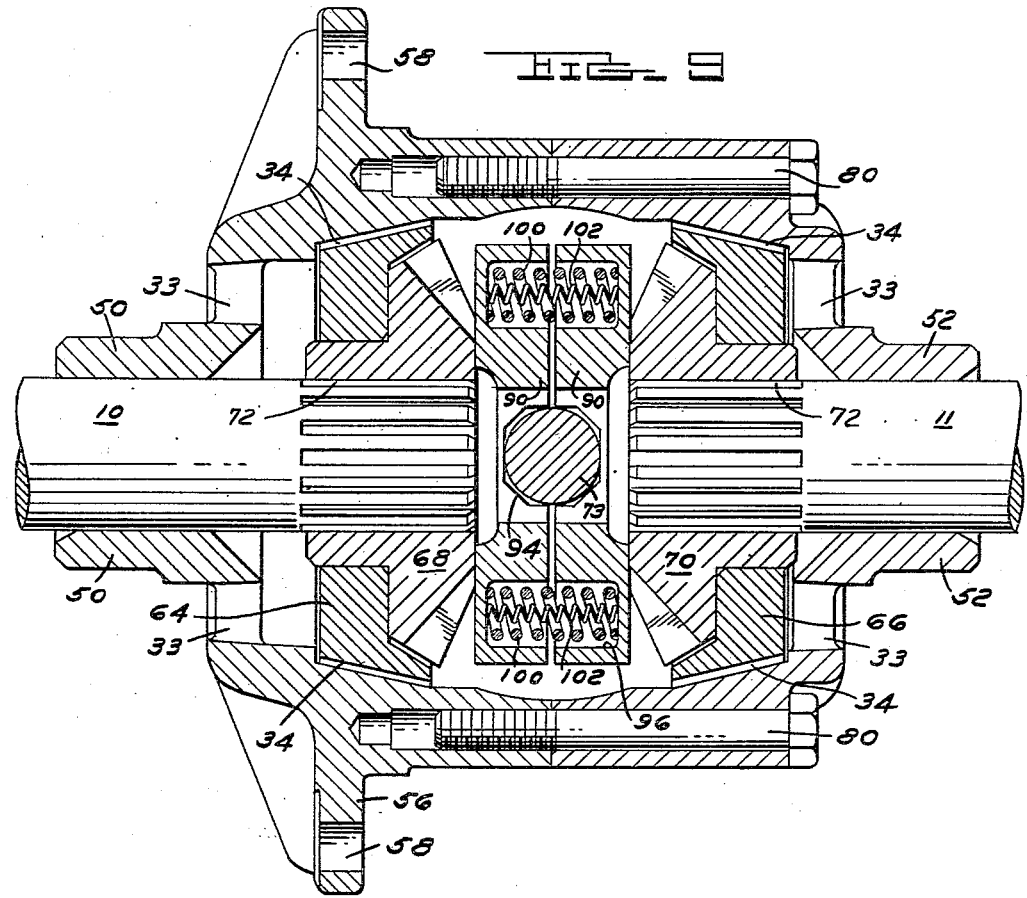
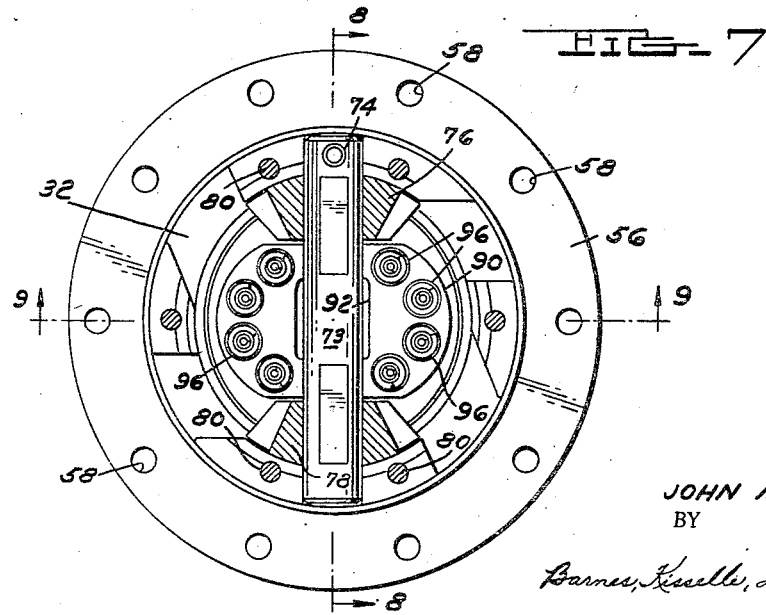
INVENTOR.
JOHN M. R. LYETH JR.
BY
Barnes, Kisselle, Laughlin & Raisch
ATTORNEYS Jan. 28, 1958     J. M. R. LYETH, JR     2,821,096
VEHICLE DIFFERENTIAL WITH CUMULATIVE TORQUE RESISTANCE
Filed June 22, 1956     4 Sheets-Sheet 4
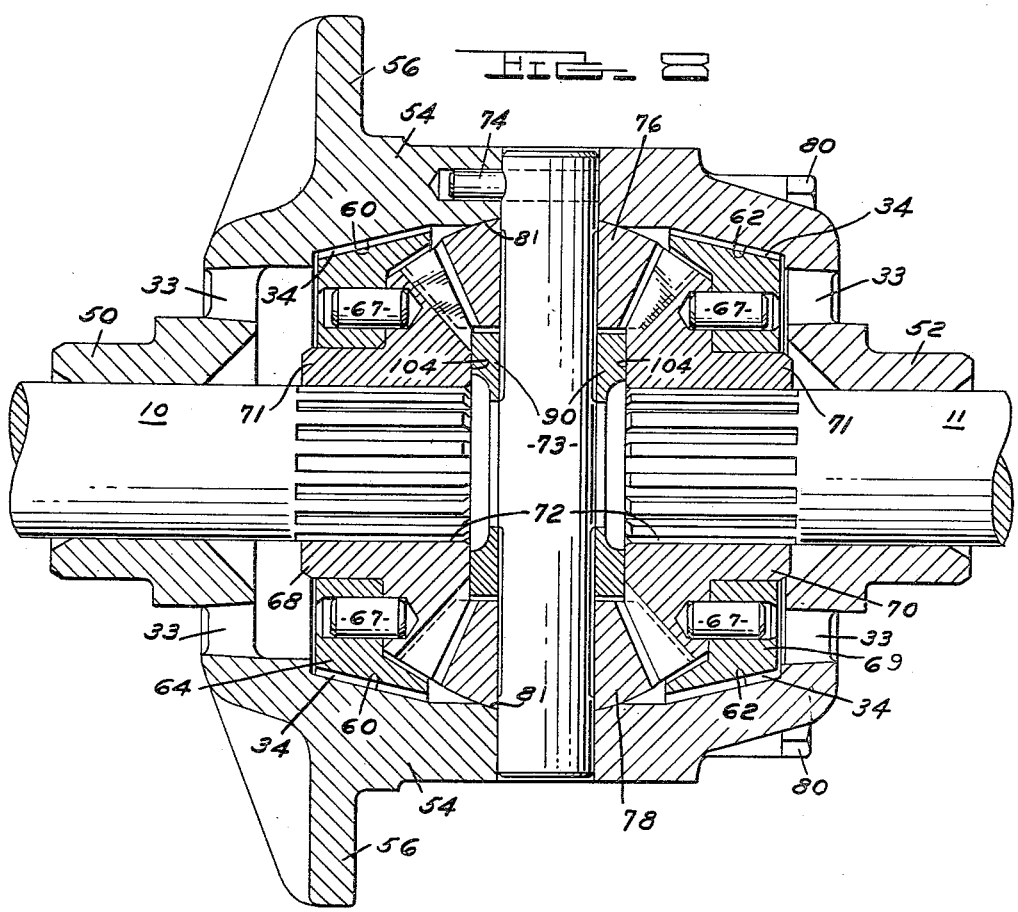
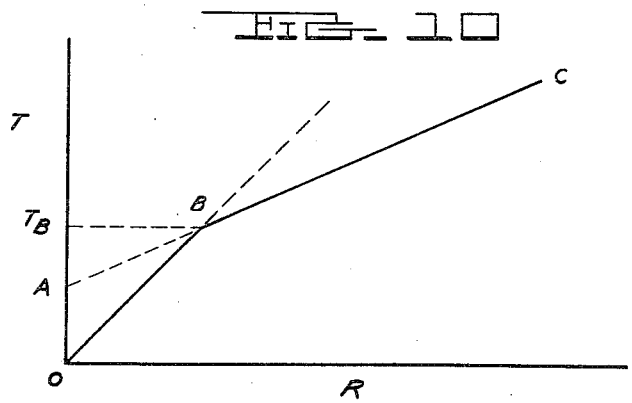
INVENTOR.
JOHN M. R. LYETH JR.
BY
Barnes, Kisselle, Laughlin & Raisch
ATTORNEYS

United States Patent Office 2,821,096
Patented Jan. 28, 1958

2,821,096

VEHICLE DIFFERENTIAL WITH CUMULATIVE TORQUE RESISTANCE

John M. R. Lyeth, Jr., East Detroit, Mich.

Application June 22, 1956, Serial No. 593,293

9 Claims. (Cl. 74—711)

This invention relates to improvements in differential mechanisms of the bevel gear type such as are used in motor vehicles and other power dividing applications which are sometimes designated as limited slip differentials or semi-locking differentials.

This application is a continuation-in-part of my co-pending application Serial No. 341,226, filed March 9, 1953, now abandoned.

The principal object of this invention is to limit the slippage (freedom) of one wheel (or output shaft) so that some torque may be transmitted to the other wheel or shaft, thereby minimizing the hazard of getting stuck when one wheel is on a slippery surface. This is accomplished by employing highly efficient and effective brakes disposed within the differential in such a manner that the cost and complexities of said differential are kept at a minimum.

It is a further object of the invention to provide simple and inexpensive means in a conventional type of differential so that a differential equipped with my device may be readily substituted for the existing differential in a motor vehicle or the like.

It is a further object of my invention to utilize the combined spring thrust and axial thrust of the bevel side gears to provide simple and self-adjusting means for actuating simple braking surfaces to restrict the slippage of this type of mechanism under varying load conditions, at the same time allowing differentiation for turning.

It is a further object of my invention to pre-load or bias the differential mechanism so that uncontrolled differential action can only occur after a predetermined minimum amount of torque difference between the two axles has been reached, and that this minimum torque difference be increased with the increase of torque transmitted by the differential.

It is still a further object of my invention to provide a differential which is of simple construction, being composed of a minimum of parts, which are not only easy to fabricate and install, but are also very economical to manufacture.

It is well known in the differential art that the purpose of such devices is to divide torque equally between two shafts and that if one shaft (or wheel) is unable to absorb torque, no torque can be supplied to the other shaft (or wheel). It is the purpose of my device, as hereinafter described, to preload or bias the differential mechanism so that the torque absorption by either output shaft cannot fall below a predetermined amount. This preloading or biasing provides internal torsional resistance or braking to differentiation, thereby insuring a minimum of torque being delivered to either shaft. In accomplishing this purpose, I apply means providing constant pressure to the inner faces of the side gears so that at all times the full force of such pressure is transmitted to resistance or braking means, with which the side gears are functionally associated, as will more clearly appear from the following description and reference to the drawings.

Certain basic characteristics of a differential must exist in order to provide the best possible performance and to do the most for the mobility of the car under adverse conditions as well as for the roadability under all conditions. First, the braking or resistance torque in the differential must be variable proportionately to the amount of ring gear torque being transmitted through the axle to provide in effect an automatic adjustment of the amount of the braking torque. Second, there should be a minimum amount of resistance torque available when one wheel is subject to very low resistance so that wheel slippage can be eliminated on low traction surfaces. Third, the resistance or braking torque should have a minimum value under conditions such as coasting, where there is no ring gear torque.

The present invention includes a combination of a biasing load in the form of springs which provide a minimum resistance or braking torque at a no-load condition and a variable load which is provided by gear tooth force in the differential. These forces, coupled with the mechanical advantage of a cone friction ring, function to provide the necessary amount of resistance torque proportional to the ring gear in-put torque and additive to the amount supplied by the springs.

Most important of all, when conditions are such that one axle shaft can absorb no torque, the initial degree of braking torque in the differential because of the springs provides a resistance which enables gear thrust to occur, which in turn further loads the cones to provide a sufficient amount of resistance to differentiation.

In describing the invention, reference will now be made to the drawings, in which:

Fig. 1 is a sectional plan of the differential showing one of the embodiments of my invention.

Fig. 2 is a cross section taken on the line 2—2 of Fig. 1.

Fig. 3 is a fragmentary sectional view taken on the line 3—3 of Fig. 2.

Fig. 4 is a cross sectional view taken on the line 4—4 of Fig. 1.

Fig. 5 is an elevational view of my differential assembly.

Fig. 6 is a fragmentary sectional plan showing a modified form of my invention.

Fig. 7 is a sectional view of one side of the differential showing a modified construction.

Fig. 8 is a sectional view on line 8—8 of Fig. 7.

Fig. 9 is a sectional view on line 9—9 of Fig. 7.

Fig. 10 is a graph plotting R-ring gear input torque against T-torsional resistance in the differential.

Referring to the drawings, the numerals 10 and 11 indicate the output axle shafts. These shafts at their adjacent or inner ends project in rotatable relation into opposed axially aligned hubs 12 and 13 of a rotary differential case 14, which case is composed of the two halves 15—15'. A conventional ring gear (not shown) is attached by means of bolts, that are secured through apertures 16, to flange 17 of the case half 15 for the reception of power drive from the propeller shaft (not shown). As is very well known, the case 14 is enclosed in the conventional manner within a differential housing (not shown), which housing carries the usual supply of lubricant for the differential.

Interiorly of the case 14 the adjacent end portions of the aforesaid axle shafts 10 and 11 are fitted with differential or side gears 19—19' having their respective hubs 20—20' splined to said shafts, the said gears being disposed in axially aligned spaced and facing relationship.

Extending diametrically through the case 14 and centrally between the gears 19—19' is a spider member 21. The said member carries bevel pinions 22 and 23 mounted thereon in spaced relationship to each other for meshing engagement with the side gears 19—19'.

The foregoing description of the elements 10 to 23, inclusive, is a description of the conventional differential construction and is employed merely for the purpose of aiding in a better understanding of the embodiment of my improved device.

In the embodiment of my invention, as shown in Figs. 1 and 3, I rigidly secure to the outer respective faces of each of the conventional side gears 19—19' annular conical rings or braking elements 24—24'. The latter are held in secured positions on the aforesaid side gears by means of a plurality of pins 25—25'. Conical seats 26—26' are machined in the interior walls of the case adjacent the hub portions 12 and 13 thereof. The aforesaid conical recesses or seats 26—26' are disposed in axially aligned spaced and facing relationship to each other, and each of said seats is, therefore, also disposed in axially aligned facing relationship to the conical rings for seating engagement of the latter therein.

A diametral bore 27 is provided intermediate the ends of spider member 21 and so disposed therein that it is in axial alignment with the axles 10 and 11 and hubs 12 and 13. A helical spring 28, having the desired pressure producing capacity, is disposed within said bore, with the respective end portions of said spring bearing against washers 29—29', which washers engage the respective inner faces 30 and 31 provided on the differential gears 19—19'. Thus, the pressure exerted by the spring 28 is equally and at all times transmitted through washers 29—29', to gears 19—19' and thence through rings 24—24' to at all times maintain the conical surfaces of the latter in contactual relationship under constant initial pressure in the conical seats 26—26'.

As heretofore stated, the usual supply of lubricant is carried in the differential housing (not shown) and this supply of lubricant is utilized, upon rotation of the differential casing 14 within the housing, to lubricate the parts of the differential which move relative to each other. For the ingress and egress of such lubricant to differential case 14, I provide therein a plurality of ports 32 (Fig. 5) and ports 33 (Figs. 1 and 2). A plurality of grooves 34, transversely machined in the faces of seats 26—26' or in the faces of the cone rings 24—24', provide passageways for the admission of an adequate supply of the lubricant to the contacting faces of rings 24—24' and seats 26—26'.

In Fig. 6 I show a variation from the aforesaid construction of differential gear 19—19' and the braking elements 24—24' carried thereby. In this modification the gear and braking element is combined into an integral or unitary structure. Thus gears 35—35' are each provided on their inner faces with the usual gear teeth 36—36' but their outer peripheral edges are tapered to coincide with the angularity of the conical faces of the seats 26—26'. In all other respects the construction and mode of operation of my device is identical with that heretofore described with relation to the device shown in Figs. 1 to 5, inclusive.

In the embodiment shown in Figs. 7 to 9, the axle shafts fit into the axle hubs 50 and 52 on a differential case 54 having a conventional ring gear flange 56 suitably apertured at 58 for fastening purposes. The interior of the housing 54 is provided with two conically shaped seats 60 and 62 for co-operation with friction rings 64 and 66 mounted on gear hubs 71 and pinned by pins 67 directly to side gears 68 and 70, the hubs being provided with splined openings 72 to receive the axle ends.

Extending diametrically through the case 54 between the gears 68—70 is a shaft 73 fastened to the housing by a pin 74 and on which is mounted the bevel pinion gears 76 and 78, these gears engaging the side gears 68 and 70. The housing 54 is formed of two sections which are bolted together by bolts 80. Formed surfaces 81 on housing around pin 73 serve as bearing surfaces for pinion gears 76, 78.

Intermediate the bevel pinions 76, 78 are two oval spring seat members 90, each of which has a square center opening 92 to accommodate an axle spacer block, not shown, and a surface slot 94 which embraces the pin 73. By this construction, the oval plates 90 are held against turning with the gears 68—70 by engagement with pin 73. The plates 90 are each provided with eight recesses 96 on the same side as the slot 94 which receive double spring assemblies consisting of an outer coil spring 100 and an inner coil 102. Single springs of proper capacity can be used. The double spring shown permits lowest spring rate and adjustment if desired. The total spring pressure exerted by the plates is critical in the sense that too low a pressure will prevent sufficient torsional resistance to resist wheel run-away and render the differential ineffective for this purpose. Too high a pressure will affect maneuverability. The back faces of these plates opposite the spring recesses bear directly on the inner faces of gears 68 and 70 at 104, and the spring pressure which tends to separate plates 90 also is transmitted to the side gears 68—70 and the conical members 64 and 66 attached thereto. With this arrangement, any relative rotation of the axles will be resisted by the multiplied friction between the conical members 64—66 and the recesses 60—62.

The variables in the above construction include the cone angles of the recesses 60—62, the force of springs 100—102, and the configurations of the gear teeth, such as the pressure angle, pitch diameter and pitch line cone angle. The coefficient of friction is important and will vary with the materials and lubricants. A housing and cone combination has proved satisfactory using a housing of cast iron with a content of .40 nickel and .60 molybdenum and cones 64—66 made of pearlitic malleable iron. Other combinations of material are .40 nickel, .60 molybdenum cast iron housing and SAE 1117, carburized and hardened steel cones; or pearlitic malleable housing with the above SAE 1117 carburized and hardened steel cones.

The variables above outlined have been related in a formula for torsional resistance representing peak static loading as follows: $T = mKF + xmCKR$. The torsional resistance of the differential to differentiation is the function of the spring force and the side gear thrust which loads the cone surfaces. In the above formula, which emphasizes the importance of the spring load plus the cone angles, the various factors are as follows:

$T$ = torsional resistance in the differential to differentiation
$m$ = co-efficient of friction
$K$ = cone constant, which is the mean diameter of the cone times the cosecant of one-half the cone angle, or, in other words, the mechanical advantage of the particular friction developing means utilized
$C$ = the gear constant, which is the tangent of the gear tooth pressure angle times the sine of one-half the side gear pitch line cone angle, all divided by the side gear pitch diameter
$x$ = factor for other losses
$F$ = force of springs
$R$ = in-put torque at the ring gear If "Q" is the torque absorbed in either axle shaft, left or right, then the in-put torque at the ring gear must equal the sum of the torques absorbed by each axle shaft disregarding friction losses. Thus, $R = Q$ (right) $+ Q$ (left). Until differentiation starts, $T = \pm Q_R \mp Q_L$ (i. e., the difference between the axle shaft torques). For example, if Q (left) is zero, then $T = Q$ (right) $= R$.

The mechanical advantage of the friction developing means is a function of its effective radius and the particular type of device used. In the specific disclosure the cone angle relates to the radius as respects the cosecant of one-half the cone angle. Other equivalent friction developing means may be used.

The amount of resistance to differentiation is shown on the diagram of Fig. 10 with T plotted against R for static loading. The line O B is for a condition where $T=R$, that is, where ring gear in-put is equal to output at one wheel, the other being free. When the curve is plotted for the disclosed differential, it takes the line A C with an assumed value for the coefficient of friction, $m$. The desired slope of line A C is $xmCK$. For the disclosed differential of Figs. 7 to 9 for use in a 1955–56 Chevrolet passenger car, the elements of the formula can be outlined.

The desired value of $T_B$ (Fig. 10) is 3200 lb.-inches which has been determined empirically and may range from 2800 lb.-inches to 3500 lb.-inches. The value of $m$ is assumed at .14 for normal operating conditions and lubrication. The gear constant C will equal about .11, using a gear having ½ cone angle of 58°, gear tooth pressure angle of 22½°, and a pitch diameter of 3.2″. The value $x$ is empirically determined (other losses) at 1.85. The value F is 765 pounds.

Using these figures in the above equation, $K=16.14$. With the mean diameter of the cone at 3.494, dictated by the gear design, the consecant of the cone ½ angle is 4.62, and the ½ cone angle=12½°. I have found that it is undesirable to go much below this 12½° angle on the cone because of self-locking tendencies.

For a given size of differential, assuming values of $m$ and $x$, and using a cone angle of 12½°, the mean diameter of the cone and all information on the gears is known. By using these known values, the spring load can be computed for a desired value of $T_B$ (Fig. 10). Mathematically, this involves substituting the value of $T_B=T=R$ in the main equation.

$$T_B = mKF + xmCKT_B$$

$$T_B - xmCKT_B = mKF$$

$$F = T_B\left(\frac{1 - xmCK}{mK}\right)$$

For the above example, $F = .239\ T_B$, and for $T_B = 3200$ lb.-inches, the $F = 765$ lbs.

From the above it can be stated that the controlling features are the value of the slope of the curve, xmCK, which represents the rate of buildup of resistance in the disclosed differential, and the value of $T_B$, which is usually adjusted by spring force. Experience shows that for some heavy, slow-moving vehicles values of the slope can be as low as .32, but for other vehicles, values as high as .7 are feasible. For the above example, a slope of .46 is satisfactory, and for passenger cars .45 to .55 has proved a satisfactory range. The torsional resistance when one wheel is free, $T_B$, is an empirical value as stated above.

The above calculations, as previously indicated, are based on peak static loading. These values can be determined by direct application and measurement of torque at the input shaft and the two output or axle shafts either on the bench or with a vehicle jacked up. Due to the pulsating effect of rolling gears, only the peak values are used.

While this specification sets forth in detail the present and preferred construction of the device, it is to be understood that in practice such deviations from such detail may be resorted to as do not form a departure from the spirit of the invention, as defined by the appended claims.

I claim:

1. A differential transmission for the transfer of power to driving wheels with a minimum resistive force to differentiation increased by, and in proportion to, the input torque, comprising, a driven housing having means for the attachment of a ring gear and axle openings in opposed sides of said housing, a recess to receive bevel side gears and pinion gears within said housing having, adjacent said axle openings, inwardly facing conical surfaces spaced from the axis of the housing outwardly to lie adjacent the outermost diameter of the recess relative to said axis and diverging toward the center of the housing, bevel side gears having inwardly facing teeth and conical extensions on the rear faces thereof to match and engage said conical surfaces whereby to form a friction developing means having a mechanical advantage, axle ends projecting into said axle openings, means on said side gears and means on said ends wherein said gears are slidably and rotatably mounted on said ends within the housing, pinion gears mounted between said side gears in mesh therewith, means to locate said pinion gears relative to said housing to permit the pinion gears to rotate but to cause them to revolve with said housing, and spring means mounted independently of said housing positioned to avoid contact with assembled axle ends within said housing exerting an equal and opposite predetermined bias on the inner faces of said side gears to force the conical extensions of said side gears into pressure contact with the conical surfaces of said housing to utilize the mechanical advantage thereof, the pitch line of said side and pinion gears being disposed at an angle to utilize the axial thrust of the meshing teeth of said gears to supplement said spring means to increase the force applied to said friction developing means in proportion to the torque input to said transmission.

2. A device as defined in claim 1 in which the means to locate said pinion gears comprises, a member having a circular recess centrally of said housing, and opposed pin extensions on said member extending through said pinion gears into said housing wherein said pinion gears may have rotatable movement on said pin extensions, said spring means being positioned in the recess within said member.

3. A device as defined in claim 1 in which the means to locate said pinion gears comprises, a pin extending diametrically of said housing into holes on opposite sides thereof and through central apertures in said pinion gears, and means centrally of said housing lying on either side of said pin and restrained against rotation thereby comprising plate members provided with a plurality of matching and facing recesses, said plates being backed against the inner faces of said side gears and shaped to avoid contact with said axle ends, said spring means comprising a plurality of coil springs extending between and located in said facing recesses to bias said plates toward said side gears.

4. A device as defined in claim 1 in which the means to locate said pinion gears comprises, a pin extending diametrically of said housing into holes on opposite sides thereof and through central apertures in said pinion gears, and means centrally of said housing lying on either side of said pin and restrained against rotation thereby comprising plate members backed against the inner faces of said side gears and shaped to avoid contact with said axle ends, said spring means extending between and located to bias said plates toward said side gears.

5. A differential transmission for the transfer of power to driving wheels with a minimum static resistive force to differentiation increased by and in proportion to the input torque comprising, a driven housing having means for the attachment of a ring gear and axle openings on opposed sides of said housing, a recess within said housing having, adjacent said axle openings, inwardly facing conical surfaces spaced from the axis of the housing outwardly to lie adjacent the outermost diameter of the recess relative to said axis and diverging toward the center of the housing, formed surfaces positioned in diametrical opposition to each other and lying on inner surfaces of said recess between said conical surfaces, bevel side gears having inwardly facing teeth on one face, a ring associated with each side gear having a conical outer surface and mounted to rotate with a side gear and engage said conical surfaces whereby to form a friction developing means having a mechanical advantage, said side gears being adapted to be rotatably and slidably mounted on axle ends projecting into said axle openings, pinion gears mounted between said side gears in mesh therewith, means to locate said pinion gears relative to said housing to permit the bevel gears to rotate but to cause them to revolve with said housing, the back face of said pinion gears being in running contact with said formed surfaces within said recess, and spring means mounted independently of said housing positioned to avoid contact with assembled axle ends within said housing exerting an equal and opposite predetermined bias on the inner faces of said side gears to force the conical extensions of said side gears into pressure contact with the conical surfaces of said housing to utilize the mechanical advantage thereof, the pitch line of said side and pinion gears being disposed at an angle to utilize the axial thrust of the meshing teeth of said gears to supplement said spring means to increase the force applied to said friction developing means in proportion to the torque input to said transmission.

6. A device as defined in claim 5 in which the means to locate said pinion gears comprises, a member having a circular recess centrally of said housing, and opposed pin extensions on said member extending through said pinion gears into said housing wherein said pinion gears may have axial and rotatable movement on said pin extensions.

7. A device as defined in claim 5 in which the means to locate said pinion gears comprises, a pin extending diametrically of said housing into holes on opposite sides thereof and through central apertures in said pinion gears, said pinion gears having an axial freedom on said pins limited outwardly by said housing, and means centrally of said housing lying on either side of said pin and restrained against rotation thereby comprising plate members backed against the inner faces of said side gears and shaped to avoid contact with said axle ends, said spring means comprising a plurality of springs extending between and located to bias said plates toward said side gears.

8. In a differential wherein a driven housing is provided with a pair of opposed axle openings in one plane and a pair of opposed freely rotatable pinion gears mounted to revolve therewith in a second plane normal to said first plane, and one end of an axle shaft is adapted to extend through each of said openings, a side gear to be slidably and drivingly attached to axle shafts in mesh with each of said pinion gears, friction developing surfaces provided between inner walls of said housing and outer walls of said side gears spaced outwardly from the axis of the housing in the zone of revolution of the pinion gears to an extent to afford a mechanical advantage to outward axial forces on the side gears to permit differential action to be resisted, and dual means for effecting frictional resistance between said surfaces including spring means between said side gears positioned to be independent of axle shaft ends in said axle openings for continuously and constantly urging said surfaces into frictional relationship to provide effective initial resistance to differential action and to provide increasing of resistance effected by other means, and said pinion gears and side gears being meshed in a relationship to constitute said other means providing a component of tooth pressure force for urging said side gears axially outwardly to effect increased resistance to differential action in proportion to input torque at all speeds, said tooth pressure force being initiated by said spring means under no-load conditions at one axle and increased by the mechanical advantage of said friction developing means.

9. A differential transmission for the transfer of power to driving wheels with a minimum resistive force to differentiation increased by and in proportion to the input torque, comprising, a driven housing having means for the attachment of a ring gear and provided with axle openings at opposed ends of said housing, a recess formed within said housing extending radially outward from the axis thereof, said axle openings being adapted to receive axle ends projecting into said recess, bevel side gears slidably and rotatably mountable on said ends within said housing adjacent the ends of said recess, pinion gears mounted between said side gears in mesh therewith located to rotate relative to and revolve with said housing, friction developing means associating said side gears and said housing radially in the zone away from the axle adjacent the outermost diameter and affording a mechanical advantage to outward axial forces on said side gears, spring means mounted to exert an equal and opposite predetermined bias on the inner faces of said side gears independently of said housing and said axle ends, whereby to apply pressure to said friction developing means to utilize the mechanical advantage thereof in resisting motion of said respective side gears, the pinion gears and side gears being meshed in a relationship to provide a component of tooth pressure for supplementally urging said side gears axially outward to increase the force applied to said friction developing means in proportion to input torque to said transmission at all speeds.

References Cited in the file of this patent

UNITED STATES PATENTS

| | | |
|---|---|---|
| 1,324,858 | Taylor | Dec. 16, 1919 |

FOREIGN PATENTS

| | | |
|---|---|---|
| 7,010 | Great Britain | Mar. 19, 1914 |
| 86,497 | Switzerland | Sept. 1, 1920 |
| 499,048 | Great Britain | Jan. 18, 1939 |
| 654,224 | Germany | Dec. 18, 1937 |
| 736,780 | Germany | June 28, 1943 |